(12) United States Patent
Yuasa

(10) Patent No.: US 10,483,030 B2
(45) Date of Patent: Nov. 19, 2019

(54) COIL UNIT, POWER TRANSMISSION DEVICE, AND POWER RECEPTION DEVICE

(71) Applicant: Toyota Jidosha Kabushiki Kaisha, Toyota-shi, Aichi-ken (JP)

(72) Inventor: Hiroaki Yuasa, Miyoshi (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 138 days.

(21) Appl. No.: 15/808,156

(22) Filed: Nov. 9, 2017

(65) Prior Publication Data

US 2018/0174738 A1    Jun. 21, 2018

(30) Foreign Application Priority Data

Dec. 21, 2016 (JP) ................................. 2016-247914

(51) Int. Cl.
*H01F 27/28* (2006.01)
*H02J 50/10* (2016.01)
(Continued)

(52) U.S. Cl.
CPC ......... *H01F 27/2823* (2013.01); *H01F 27/24* (2013.01); *H01F 38/14* (2013.01); *H02J 50/10* (2016.02)

(58) Field of Classification Search
CPC ...... H01F 27/28; H01F 27/24; H01F 27/2823; H01F 27/365; H01F 27/42; H01F 38/14;
(Continued)

(56) References Cited

U.S. PATENT DOCUMENTS 5,955,814 A * 9/1999 Fujiwara ............... H02K 1/141
310/216.087
9,842,687 B2 * 12/2017 Kurs ....................... H01F 38/14
(Continued)

FOREIGN PATENT DOCUMENTS

CN    104303363 A    1/2015
JP    2013110822 A    6/2013
(Continued)

OTHER PUBLICATIONS

Mickel Budhia et al.,, "Design and optimization of Magnetic Structures for Lumped Inductive Power Transfer Systems", Energy Conversion Congress and Exposition, 2009. IEEE, p. 2081-2088, Sep. 2009.

*Primary Examiner* — Hal Kaplan
*Assistant Examiner* — Jagdeep S Dhillon
(74) *Attorney, Agent, or Firm* — Dinsmore & Shohl LLP

(57) ABSTRACT

A coil unit includes ferrite cores; and a coil disposed to face the ferrite cores, the coil including a plurality of curve portions. Each curve portion is wound across a virtual straight line extending through a curvature center of the curve portion. The ferrite cores include curve portion ferrite cores disposed to face the curve portions, respectively. Each of the curve portion ferrite cores is provided such that a width of a region with a highest magnetic flux density is larger than a width of a region other than the region with the highest magnetic flux density, in a region that faces the coil, in a case where a length direction is defined as a direction in which the virtual straight line extends, and a width direction is defined as a direction perpendicular to the virtual straight line.

9 Claims, 8 Drawing Sheets

(51) Int. Cl.
  *H01F 38/14* (2006.01)
  *H01F 27/24* (2006.01)
(58) Field of Classification Search
  CPC .. H02J 50/10; H02J 50/90; H02J 50/60; H02J 50/20; H02J 17/00; H02J 5/00; H02J 5/005; H02J 7/025; H01Q 7/00; H02K 1/12
  USPC .... 307/104, 149, 9.1, 10.1, 66, 80; 310/258, 310/254, 259, 42
  See application file for complete search history.

(56) References Cited

U.S. PATENT DOCUMENTS

| | | | |
|---|---|---|---|
| 10,153,663 B2 * | 12/2018 | Yuasa | H01F 3/10 |
| 2011/0291904 A1 * | 12/2011 | Conway | H01Q 7/08 |
| | | | 343/788 |
| 2013/0127409 A1 | 5/2013 | Ichikawa | |
| 2013/0193749 A1 | 8/2013 | Nakamura et al. | |
| 2015/0008877 A1 | 1/2015 | Ichikawa et al. | |
| 2015/0137612 A1 * | 5/2015 | Yamakawa | H01F 38/14 |
| | | | 307/104 |
| 2015/0302985 A1 * | 10/2015 | Kurs | H01F 38/14 |
| | | | 307/104 |
| 2015/0357828 A1 * | 12/2015 | Ichikawa | H01F 38/14 |
| | | | 307/104 |
| 2016/0204621 A1 * | 7/2016 | Urano | B60L 53/32 |
| | | | 307/104 |
| 2016/0268847 A1 | 9/2016 | Yuasa | |
| 2017/0018947 A1 * | 1/2017 | Chien | H02J 7/025 |
| 2018/0114629 A1 | 4/2018 | Maikawa | |

FOREIGN PATENT DOCUMENTS

| | | |
|---|---|---|
| JP | 2013126327 A | 6/2013 |
| JP | 2013146148 A | 7/2013 |
| JP | 2013146154 A | 7/2013 |
| JP | 2013154815 A | 8/2013 |
| JP | 2016129164 A | 7/2016 |
| JP | 2016171612 A | 9/2016 |
| WO | 2016162965 A1 | 10/2016 |

* cited by examiner

COIL UNIT, POWER TRANSMISSION DEVICE, AND POWER RECEPTION DEVICE

CROSS-REFERENCE TO RELATED APPLICATIONS

This application claims priority to Japanese Patent Application No. 2016-247914 filed on Dec. 21, 2016, which is incorporated herein by reference in its entirety including the specification, drawings and abstract.

BACKGROUND

1. Technical Field

The disclosure relates to a coil unit that is used for a power transmission device that transmits electric power to a power reception device in a contactless manner, and the power reception device that receives electric power from the power transmission device in a contactless manner.

2. Description of Related Art

As disclosed in Japanese Patent Application Publication No. 2013-154815 (JP 2013-154815 A), Japanese Patent Application Publication No. 2013-146154 (JP 2013-146154 A), Japanese Patent Application Publication No. 2013-146148 (JP 2013-146148 A), Japanese Patent Application Publication No. 2013-110822 (JP 2013-110822 A), and Japanese Patent Application Publication No. 2013-126327 (JP 2013-126327 A), a power transmission device that transmits electric power to a power reception device in a contactless manner, and the power reception device that receives electric power from the power transmission device in a contactless manner are known. As disclosed in JP 2016-129164 A, each device that transmits or receives electric power in a contactless manner includes substantially plate-shaped ferrite cores having opposed surfaces and back surfaces, and an annular coil that is provided on the opposed surfaces of the annularly disposed ferrite cores. In the case of the power transmission device, each opposed surface is a surface of the power transmission-side ferrite core, which is close to the power reception device. In the case of the power reception device, each opposed surface is a surface of the power reception-side ferrite core, which is close to the power transmission device.

SUMMARY

In general, a coil unit having the same structure is used for a power transmission device and a power reception device. The coil unit includes plate-shaped ferrite cores and an annular coil that is annularly wound. In the case where the coil is wound to have, for example, a substantially rectangular shape in a plan view, the coil is provided with four straight portions (side portions), and curve portions (angular portions) that are located at four corners of the coil such that the winding direction of the coil is changed at 90 degrees.

In a coil unit 220 having this configuration, the straight portions of the coil linearly cross the ferrite cores, and the curve portions of the coil cross the ferrite cores in a curved manner. Therefore, when the amounts of magnetic flux flowing through the ferrite cores per unit length are compared with each other at the straight portion and the curve portion, the amount of magnetic flux is larger at the curve portion than at the straight portion. As a result, the density of magnetic flux flowing through the ferrite cores is higher at the curve portion than at the straight portion. Furthermore, at the curve portion, the density of magnetic flux flowing through the ferrite core is high at a central region of the coil in a radial direction thereof. Thus, in the ferrite core that faces the curve portion of the coil, the magnetic flux density is highest at a region corresponding to the central region of the coil in the radial direction. Thus, in the ferrite core, the temperature becomes high at a radial region around the region with the highest magnetic flux density.

When a high-temperature region and a low-temperature region are generated in a single ferrite core, a temperature gradient is caused in the ferrite core, and a thermal stress is generated inside the ferrite core. When the thermal stress is generated inside the ferrite core, the magnetic resistance of the ferrite core becomes large. When magnetic flux passes through the region of the ferrite core with the large magnetic resistance, magnetic energy is converted into heat. Therefore, the temperature of the region of the ferrite core further rises, and the loss of magnetic energy becomes large.

The disclosure provides a coil unit configured to suppress loss of magnetic energy, a power transmission device including the coil unit, and a power reception device including the coil unit.

The coil unit described in the disclosure is a coil unit including ferrite cores each of which is in a form of a plate; and a coil that is disposed to face the ferrite cores, the coil surrounding an area around a winding axis extending in a thickness direction of each of the ferrite cores, and the coil including a plurality of curve portions. The coil unit is configured as follows.

Each of the plurality of curve portions of the coil is wound across a virtual straight line extending through a curvature center of the curve portion. The ferrite cores include curve portion ferrite cores that are disposed to face the plurality of the curve portions, respectively. Each of the curve portion ferrite cores is provided such that a width of a region with a highest magnetic flux density is larger than a width of a region other than the region with the highest magnetic flux density, in a region that faces the coil, in a case where a length direction is defined as a direction in which the virtual straight line extends, and a width direction is defined as a direction perpendicular to the virtual straight line.

Thus, the region with the highest magnetic flux density is a region where the temperature of the ferrite core may become high. However, the generated heat can be dispersed by employing the configuration in which the width of the region with the highest magnetic flux density is larger than the width of the region other than the region with the highest magnetic flux density. Thus, it is possible to avoid an occurrence of a situation where the temperature becomes high in the region with the highest magnetic flux density.

In the coil unit described in the disclosure, in each of the curve portion ferrite cores facing the plurality of curve portions of the coil, the width of the region where the temperature of the ferrite core may become high is larger than the width of the region other than the region where the temperature of the ferrite core may become high. Thus, heat is dispersed in accordance with heat generation states. Thus, when each of the curve portion ferrite cores is observed as a whole, heat is equalized. As a result, generation of a heat gradient can be suppressed in each of the curve portion ferrite cores, and thus, a thermal stress can be reduced. Thus, the loss of magnetic energy can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
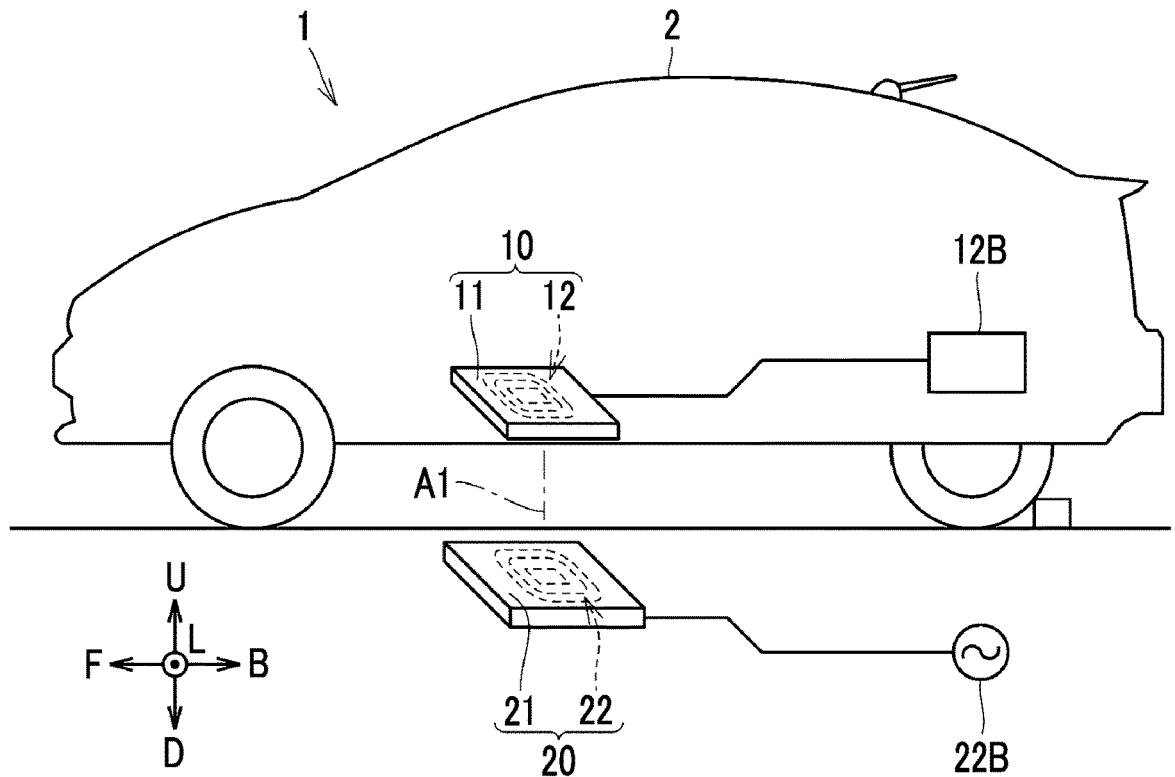
FIG. 1 is a schematic view showing a contactless charging system.

Embodiments will be described hereinafter with reference to the drawings. In the embodiments that will be described hereinafter, when the number, amount, and the like of components are mentioned, the disclosure is not limited thereto unless otherwise specified. Like or equivalent components are denoted by like reference numerals, and redundant description thereof may not be repeated. The configurations of the embodiments may be used in any appropriate combination. The drawings may not be made at actual dimensional ratios, and parts of the drawings may be made at dimensional ratios different from the actual dimensional ratios so as to facilitate the understanding of the structure.

FIG. 1 schematically shows a contactless charging system 1. The contactless charging system 1 includes a power reception device 10 and a power transmission device 20. The power reception device 10 includes a housing 11, and a coil unit 12 that is accommodated in the housing 11. The power transmission device 20 includes a housing 21, and a coil unit 22 that is accommodated in the housing 21. In the present embodiment, the power reception device 10 is mounted in a vehicle 2, and the power transmission device 20 is installed on the ground.

Figure 2:
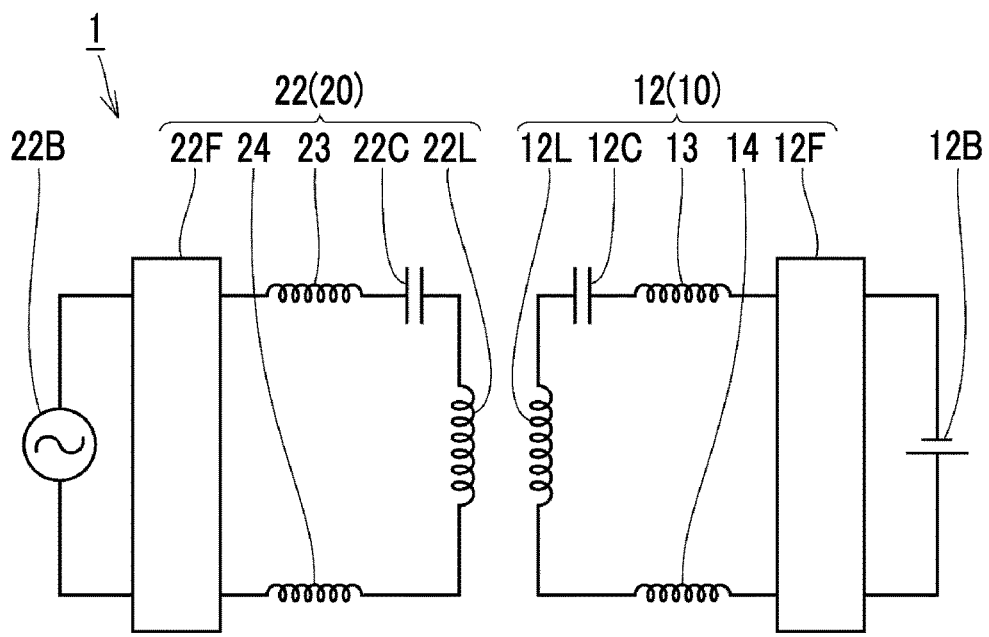
FIG. 2 is a view showing a circuit configuration of the contactless charging system.

FIG. 2 shows a circuit configuration of the contactless charging system 1. The coil unit 12 of the power reception device 10 includes a power reception coil 12L, a capacitor 12C, filter units 13 and 14, and a rectifier 12F. The rectifier 12F includes a plurality of switching elements (not shown). The power reception device 10 receives electric power from the power transmission device 20 in a contactless manner. An alternating-current (AC) power received by the power reception device 10 (the power reception coil 12L) is converted into a direct-current (DC) power by the rectifier 12F, and the DC power is supplied to a battery 12B.

The filter unit 13 of the power reception device 10 is provided between the 6 capacitor 12C and the rectifier 12F, and the filter unit 14 of the power reception device 10 is provided between the power reception coil 12L and the rectifier 12F. The filter units 13 and 14 restrain the noise generated through the operation of the rectifier 12F from being discharged to the outside from the power reception coil 12L.

The coil unit 22 of the power transmission device 20 includes a coil 22L, a capacitor 22C for power transmission, filter units 23, 24, and a frequency converter 22F. The frequency converter 22F includes a plurality of switching elements (not shown). The frequency converter 22F changes the frequency of an alternating current that is supplied from a power supply 22B, boosts a voltage, and supplies the boosted voltage to the coil 22L for power transmission.

The filter unit 23 of the power transmission device 20 is provided between the capacitor 22C and the frequency converter 22F, and the filter unit 24 of the power transmission device 20 is provided between the coil 22L for power transmission and the frequency converter 22F. Capacitors may be connected in parallel with the coil 22L for power transmission, between the filter units 23, 24 and the frequency converter 22F. The filter units 23, 24 restrain the noise generated through the operation of the frequency converter 22F from being discharged to the outside from the coil 22L for power transmission.

Referring again to FIG. 1, the power transmission device 20 is disposed to face the power reception device 10 to transmit electric power to the power reception device 10 in a contactless manner. The power reception device 10 is disposed to face the power transmission device 20 to receive electric power from the power transmission device 20 in a contactless manner. In an example shown in FIG. 1, the power reception device 10 is disposed on a bottom surface of the vehicle 2, and the power transmission device 20 is installed on the ground. Therefore, when electric power is transferred, the power reception device 10 and the power transmission device 20 face each other in an up-down direction (a vertical direction).

In the present embodiment, the direction from the power reception device 10, which faces the power transmission device 20, toward the power transmission device 20 is a downward direction D. The direction from the power transmission device 20, which faces the power reception device 10, toward the power reception device 10 is an upward direction U. The directions may differ depending on the position where the power reception device 10 is mounted and the position where the power transmission device 20 is disposed.

The coil unit 22 used for the power transmission device 20, and the coil unit 12 used for the power reception device 10 have the same configuration. The coil unit 220 according to the related art and a coil unit 320 according to the present embodiment will be described hereinafter.

Figure 3:
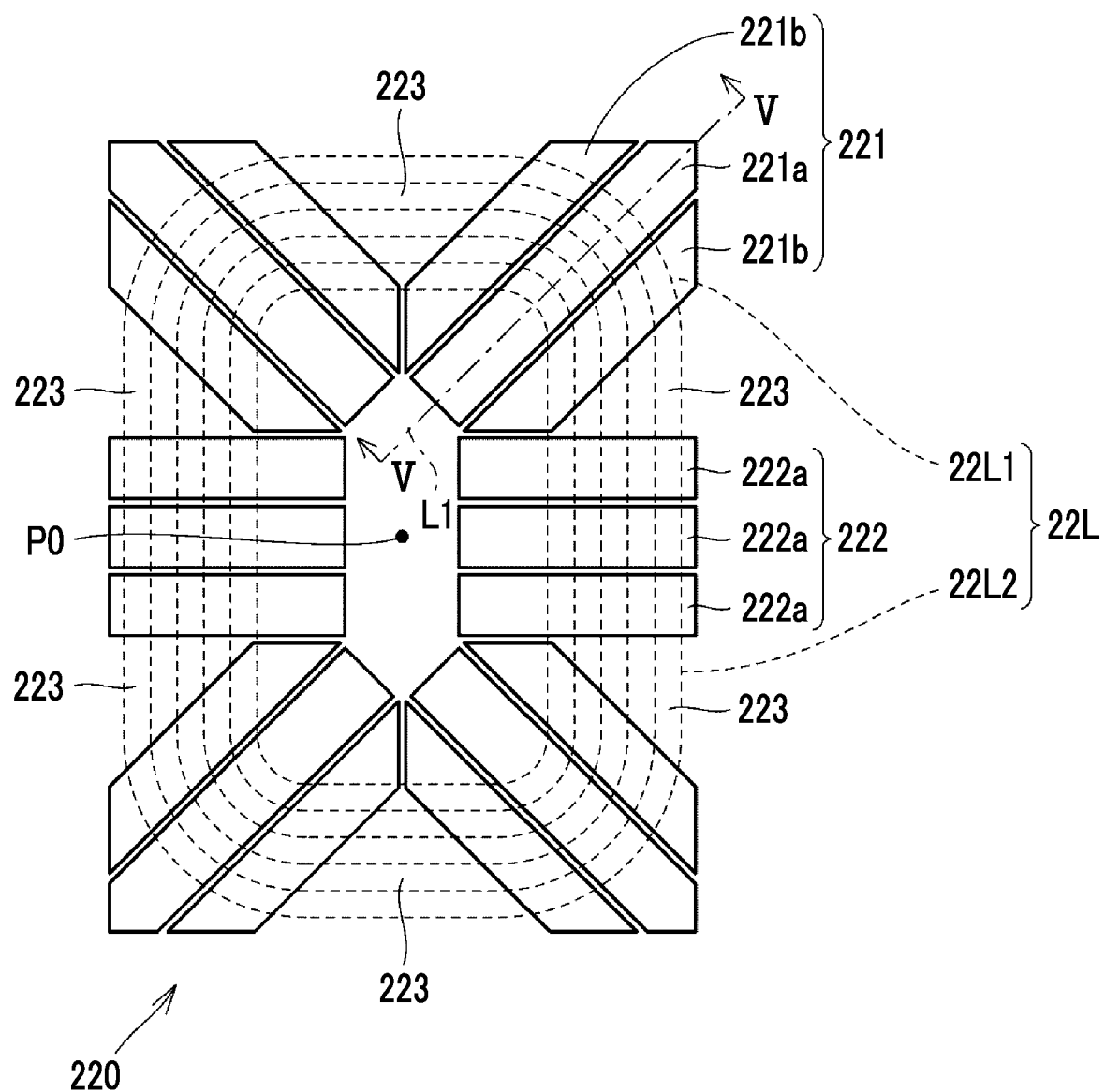
FIG. 3 is a plan view of ferrite cores and a coil that are employed in a coil unit that is used for a power transmission device and a power reception device according to related art.
Figure 4:
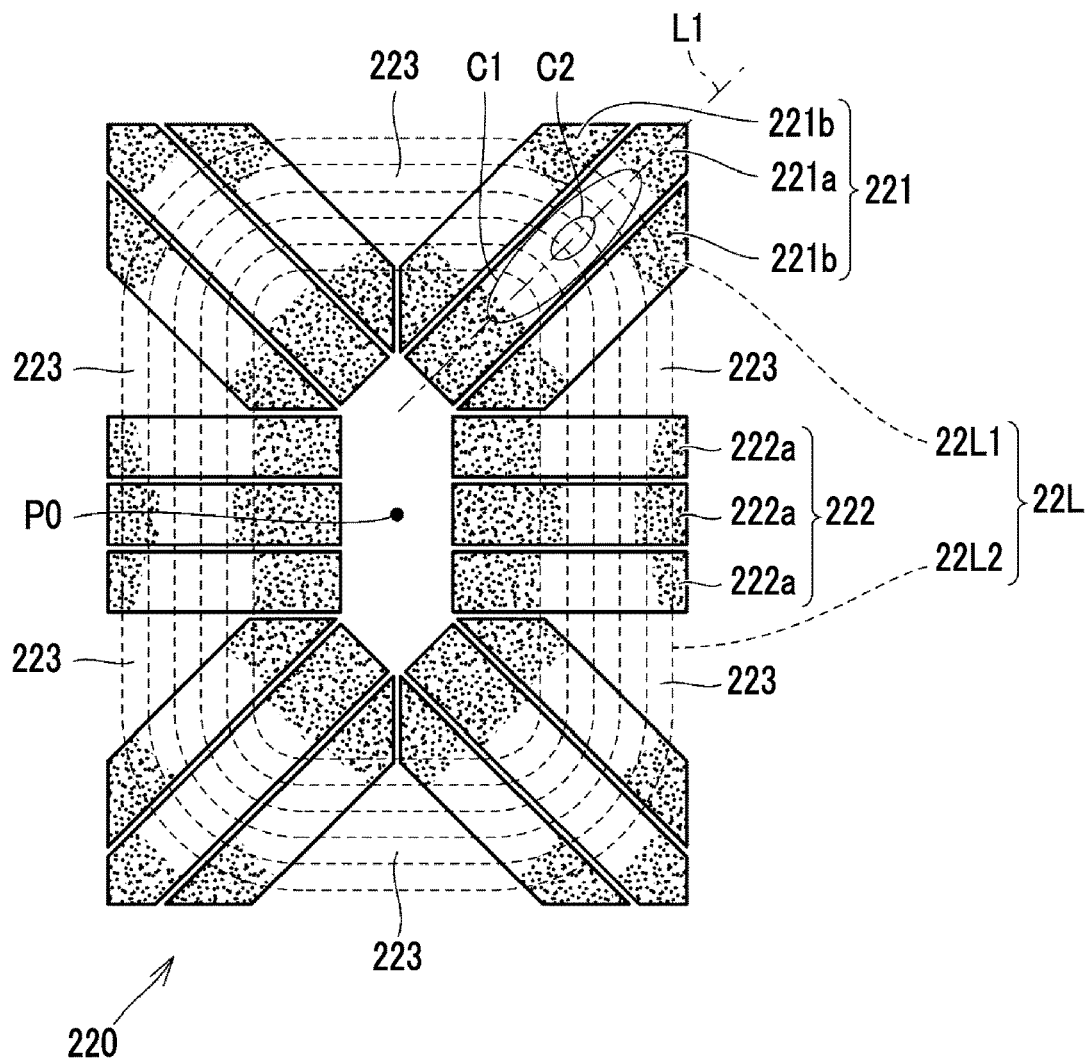
FIG. 4 is a schematic view showing heat generation states of the ferrite cores according to the related art.
Figure 5:
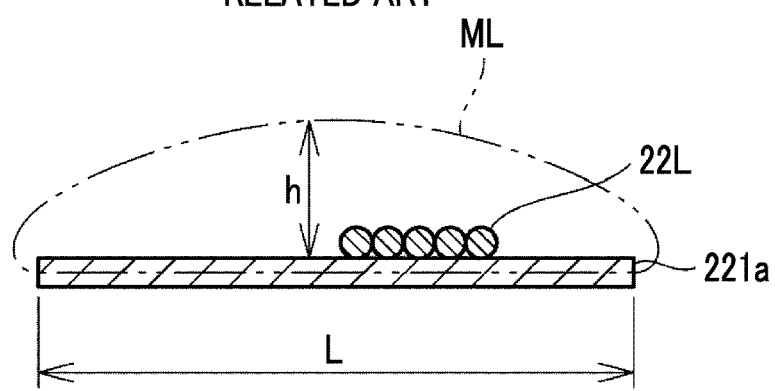
FIG. 5 is a sectional view taken along a line V-V in FIG. 3, as viewed in a direction indicated by arrows.

The coil unit 220 according to the related art will be described with reference to FIGS. 3 to 5. FIG. 3 is a plan view of ferrite cores and a coil that are employed in the coil unit 220 according to the related art. FIG. 4 is a schematic view showing heat generation states of the ferrite cores according to the related art. FIG. 5 is a sectional view taken along the line V-V in FIG. 3, as viewed in a direction indicated by arrows.

Referring to FIG. 3, the coil unit 220 includes ferrite cores 221, 222 in the form of plates, and a coil 22L. The coil 22L is disposed to face the ferrite cores 221, 222. The coil 22L surrounds an area around a winding axis P0 extending in a thickness direction of the ferrite cores 221, 222 (i.e., a direction perpendicular to the sheet of FIG. 3), and includes a plurality of curve portions 22L1 and a plurality of straight portions 22L2 to have an annular shape.

The coil 22L is rectangular as viewed in the direction of the winding axis P0. The curve portions 22L1 of the coil 22L are provided at four corners of the coil 22L, and the coil 22L is wound at an angle of 90 degrees at each of the curve portions 22L1. The straight portions 22L2 connect first ends and second ends of the curve portions 22L1.

The ferrite cores 221, 222 in the form of plates include curve portion ferrite cores 221 that are disposed to face the curve portions 22L1 of the coil 22L, and straight portion ferrite cores 222 that are disposed to face the straight portions 22L2 of the coil 22L.

Each of the curve portion ferrite cores 221 includes three ferrite cores, namely, a central portion ferrite core 221a that is located at a center, and two lateral portion ferrite cores 221b that are located on respective sides of this central portion ferrite core 221a. Each of the central portion ferrite core 221a and the lateral portion ferrite cores 221b is provided to extend from the inside of the curve portion 22L1 of the coil 22L to the outside of the curve portion 22L1.

Each of the straight portion ferrite cores 222 includes three straight portion ferrite cores 222a. Each of the straight portion ferrite cores 222a has a rectangular shape extending from the inside of the straight portion 22L2 of the coil 22L to the outside of the straight portion 22L2.

Each of end portions of the central portion ferrite core 221a and the lateral portion ferrite cores 221b has an outline (oblique side(s)) along the inner shape of a rectangular housing that accommodates the coil unit 220, each of the end portions being located in a region that projects outward from the curve portion 22L1 of the coil 22L. Each of end portions of the lateral portion ferrite cores 221b has an outline (oblique side) along the lateral side of an adjacent one of the straight portion ferrite cores 222a, each of the end portions being located in a region that projects inward from the curve portion 22L1 of the coil 22L.

In the coil unit 220 configured as described above, each of the straight portions 22L2 of the coil 22L linearly crosses the corresponding straight portion ferrite core 222, and each of the curve portions 22L1 of the coil 22L crosses the corresponding curve portion ferrite core 221 in a curved manner. Therefore, when the amount of magnetic flux flowing through the curve portion ferrite core 221 per unit length and the amount of magnetic flux flowing through the straight portion ferrite core 222 per unit length are compared with each other at the straight portion 22L2 of the coil 22L and the curve portion 22L1 of the coil 22L, the amount of magnetic flux is larger at the curve portion than at the straight portion. As a result, the density of magnetic flux flowing through the ferrite cores 221, 222 is higher at the curve portion than at the straight portion. Furthermore, at the curve portion, the density of magnetic flux flowing through the curve portion ferrite core 221 is high at a central region of the coil 22L in a radial direction thereof.

Thus, as shown in FIG. 4, in each of the curve portion ferrite cores 221 that face the curve portions 22L1 of the coil 22L, the magnetic flux density is highest at a region corresponding to a central region C2 of the coil 22L in the radial direction. Thus, in the curve portion ferrite core 221, the temperature becomes high at a region corresponding to a radial region C1 around the central region C2 with the highest magnetic flux density. In FIG. 4, regions that are not hatched by dots indicate high-temperature regions, and regions that are hatched by dots indicate low-temperature regions.

In the coil unit 220 according to the related art, gaps 223 are provided between the curve portion ferrite cores 221 adjacent to each other, and between each of the curve portion ferrite cores 221 and the straight portion ferrite cores 222 adjacent to the curve portion ferrite core 221. No magnetic flux passes through the gaps 223. Thus, magnetic flux passes, in a concentrated manner, through regions where the curve portion ferrite cores 221 are provided. As a result, the magnetic flux density in the regions where the curve portion ferrite cores 221 are provided can be further increased. As shown in FIG. 5, a height h of a magnetic field line ML from the surface of the central portion ferrite core 221a is high, and thus, power transmission/reception efficiency can be increased. However, the temperature of each of the curve portion ferrite cores 221 becomes higher.

Referring again to FIG. 4, a large amount of magnetic flux flows through the regions of the curve portion ferrite cores 221, the regions facing the curve portions 22L1 of the coil 22L. Thus, the temperature of the regions is higher than the temperatures of the inner and outer regions that project from the curve portions 22L1 of the coil 22L, which face the curve portion ferrite cores 221. In particular, at the curve portions 22L1 of the coil 22L, a large amount of magnetic flux flows through the regions C2 and C1 of the coil 22L, and the magnetic flux density of the regions becomes high. The temperature of the regions with high magnetic flux density becomes high. As a result, the temperature of the curve portion ferrite cores 221 that face the curve portions 22L1 becomes higher than the temperatures of the other regions.

When the temperature state of the single central portion ferrite core 221a is observed, the temperatures of the inner and outer regions of the central portion ferrite core 221a, which project from the curve portion 22L1, are low while the temperature of the region C2 is the highest. As a result, a large temperature gradient is caused in the single central portion ferrite core 221a.

When the large temperature gradient is caused inside the ferrite core, a thermal stress is generated inside the ferrite core. When the thermal stress is generated inside 16 the ferrite core, the magnetic resistance of the ferrite core becomes large. When magnetic flux passes through a region of the ferrite core, which has the large magnetic resistance, magnetic energy is converted into heat. Therefore, the temperature of the region of the ferrite core further rises, and the loss of magnetic energy becomes large.

Thus, the coil unit configured to be able to suppress loss of magnetic energy according to each of the embodiments will be described hereinafter.

A coil unit 320 according to a first embodiment will be described with reference to FIGS. 6 to 9. In the contactless charging system 1 described with reference to FIG. 1, this coil unit 320 can be used as both a coil unit for the power reception device 10 and a coil unit for the power transmission device 20.

Figure 6:
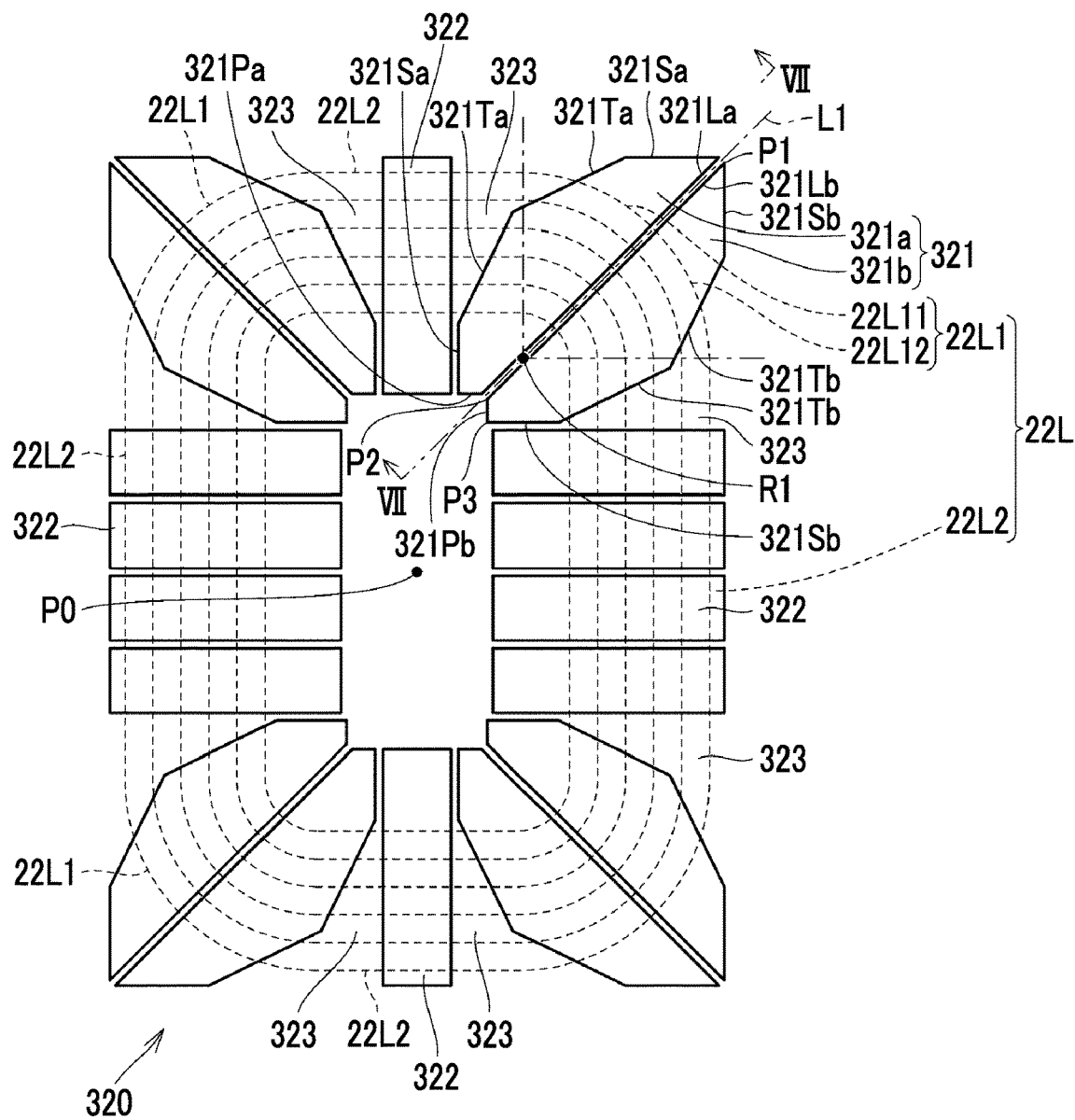
FIG. 6 is a plan view of ferrite cores and a coil that are employed in a coil unit that is used for a power transmission device and a power reception device according to a first embodiment.
Figure 7:
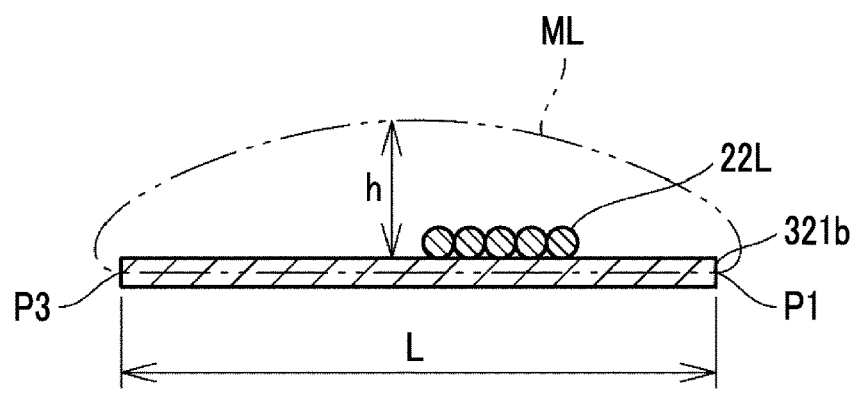
FIG. 7 is a sectional view taken along a line VII-VII in FIG. 6, as viewed in a direction indicated by arrows.
Figure 8:
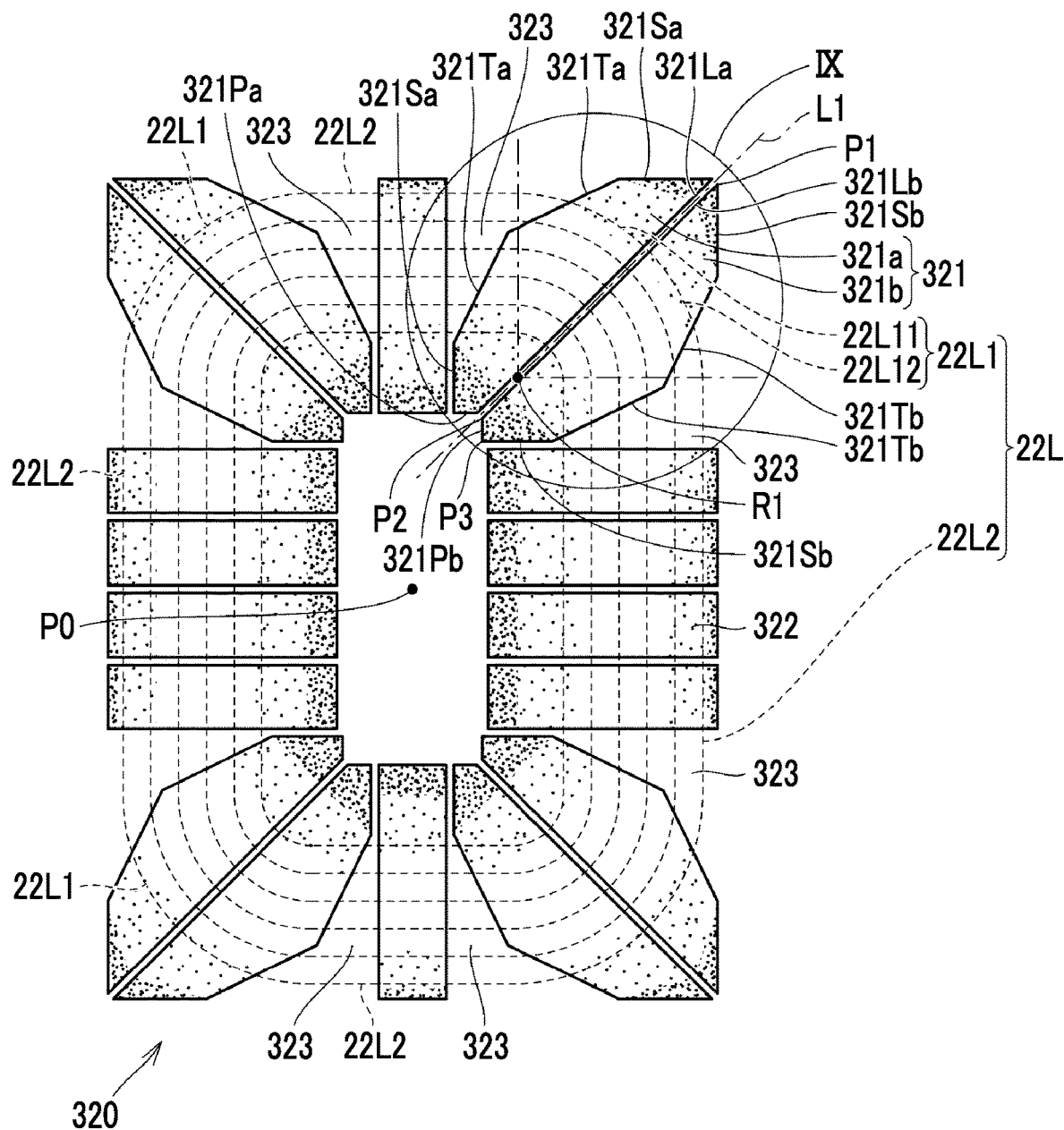
FIG. 8 is a schematic view showing heat generation states of the ferrite cores according to the first embodiment.
Figure 9:
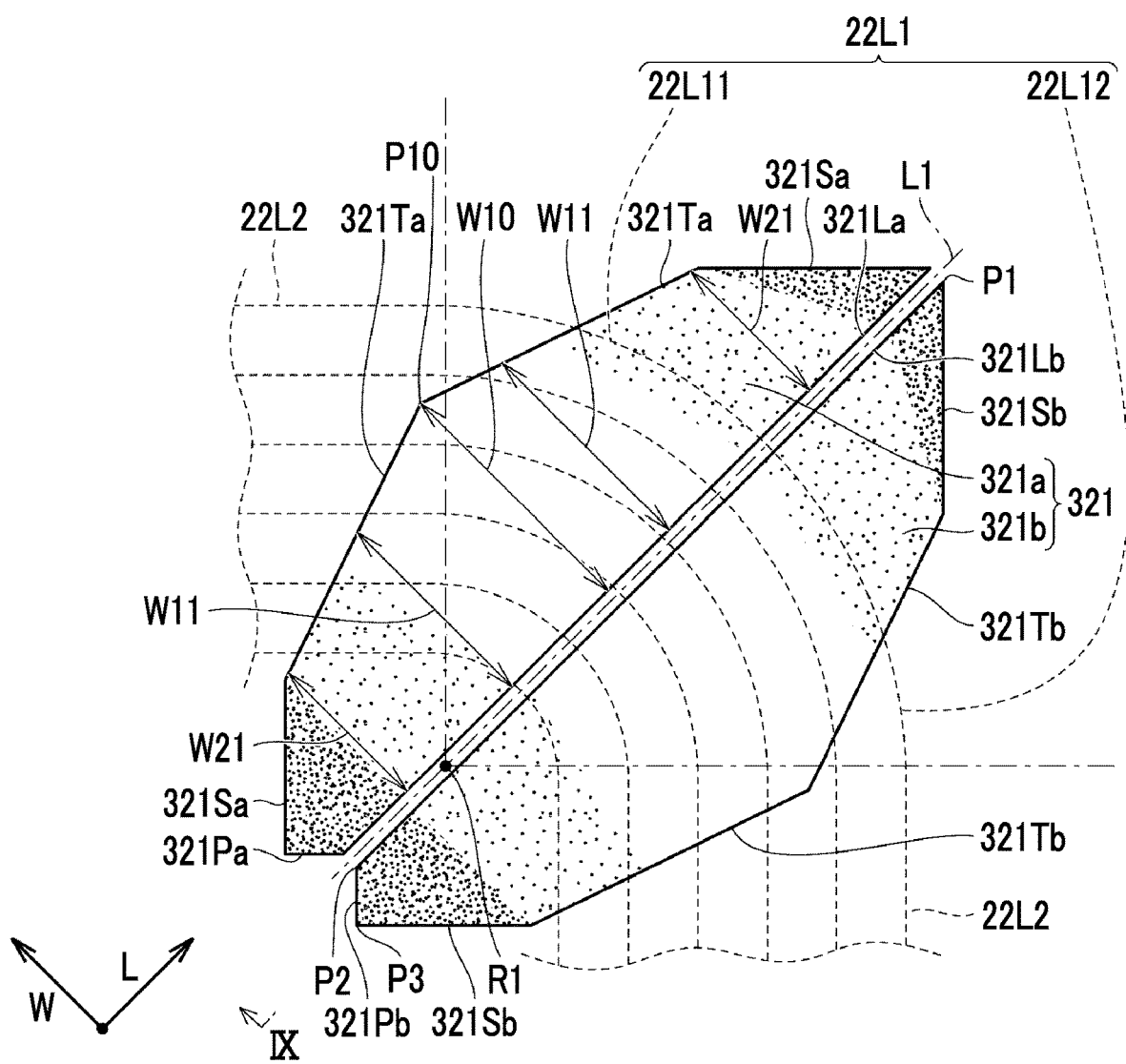
FIG. 9 is a partially enlarged view of a region that is surrounded by a line IX in FIG. 8.

FIG. 6 is a plan view of ferrite cores 321, 322 and the coil 22L that are employed in the coil unit 320 that is used for the power transmission device and the power reception device. FIG. 7 is a sectional view taken along the line VII-VII in FIG. 6, as viewed in a direction indicated by arrows. FIG. 8 is a schematic view showing heat generation states of the ferrite cores 321, 322. FIG. 9 is a partially enlarged view of a region that is surrounded by a line IX in FIG. 8.

Referring to FIG. 6, the coil unit 320 includes the ferrite cores 321, 322 in the form of plates, and the coil 22L. The coil 22L is disposed to face the ferrite cores 321, 322. The coil 22L surrounds an area around the winding axis P0 extending in a thickness direction of the ferrite cores 321, 322 (a direction perpendicular to the sheet of FIG. 6). The coil 22L includes the plurality of curve portions 22L1 and the plurality of straight portions 22L2 to have an annular shape.

The coil 22L is the same as the coil 22L described with reference to FIG. 3. The same components will be denoted by the same reference numeral, and redundant description thereof will not be repeated. Each of the curve portions 22L1 of the coil 22L includes a first side 22L11 that is connected to one of the straight portions 22L2 and a second side 22L12 that is connected to another of the straight portions 22L2, the first side 22L11 and the second side 22L12 being located on respective sides of a virtual straight line L1 that extends through a curvature center R1 of the curve portion 22L1. That is, each of the curve portions 22L1 is wound across the virtual straight line L1. The same applies to the curve portions 22L1 at the four corners.

In the present embodiment, the coil 22L has a rectangular shape as viewed in the direction of the winding axis P0. The coil 22L is wound at an angle of 90 degrees at each of the curve portions 22L1 provided at the four corners of the coil 22L. The virtual straight line L1 is a straight line that divides each of the curve portions 22L1 into two portions at an angle of 45 degrees. Accordingly, each of the curve portions 22L1 is symmetrical with respect to the virtual straight line L1.

Each of the ferrite cores 321 includes a first curve portion ferrite core 321a and a second curve portion ferrite core 321b. The first curve portion ferrite core 321a is disposed to correspond to the first side 22L11 of the coil 22L on one side of the virtual straight line L1, and extends from the inside of the curve portion 22L1 to the outside thereof. The second curve portion ferrite core 321b is disposed to correspond to the second side 22L12 of the coil 22L on the other side of the virtual straight line L1, and extends from the inside of the curve portion 22L1 to the outside thereof. The first curve portion ferrite core 321a and the second curve portion ferrite core 321b are symmetrical to each other with respect to the virtual straight line L1.

Each of the ferrite cores 321 includes the first curve portion ferrite core 321a and the second curve portion ferrite core 321b. Thus, all the ferrite cores 321 at the four corners have the same configuration.

The straight portion ferrite cores 322 are provided among the ferrite cores 321 located at the four corners. Each of the straight portion ferrite cores 322 is disposed to face the straight portion 22L2 of the coil 22L, and extends from the inside of the straight portion 22L2 to the outside thereof. The single straight portion ferrite core 322 is disposed between the ferrite cores 321 on each of short sides (an upper side and a lower side in the drawing) of the coil 22L. The four straight portion ferrite cores 322 are disposed between the ferrite cores 321 on each of long sides (a right side and a left side in the drawing) of the coil 22L. The straight portion ferrite cores 322 are all rectangular.

The shapes of the first curve portion ferrite core 321a and the second curve portion ferrite core 321b, which constitute each of the ferrite cores 321 located at the four corners, will be described again.

The first curve portion ferrite core 321a has an outline including a straight side 321La, outer oblique sides 321Sa, and inner oblique sides 321Ta. The straight side 321La is located on the side of the virtual straight line L1. Each outer oblique side 321Sa is inclined in a direction such that a distance between the outer oblique side 321Sa and the straight side 321La increases from an outer end or an inner end of the straight side 321La toward an inner portion of the straight side 321La. Each inner oblique side 321Ta is more gently inclined than the outer oblique side 321Sa in a direction such that the distance between the inner oblique side 321Ta and the straight side 321La increases.

An extended side 321Pa is provided in a region of the first curve portion ferrite core 321a, the region being located inward of the coil 22L. The extended side 321Pa extends from the inner end of the straight side 321La toward the straight portion ferrite core 322. This extended side 32Pa intersects with the outer oblique side 321Sa.

The second curve portion ferrite core 321b has a configuration similar to that of the first curve portion ferrite core 321a. The second curve portion ferrite core 321b has an outline including straight side 321Lb, outer oblique sides 321Sb, and inner oblique sides 321Tb. The straight side 321Lb is located on the side of the virtual straight line L1. Each outer oblique side 321Sb is inclined in a direction such that a distance between the outer oblique side 321Sb and the straight side 321Lb increases from an outer end or an inner end of the straight side 321Lb toward an inner portion of the straight side 321Lb. Each inner oblique side 321Tb is more gently inclined than the outer oblique side 321Sb in a direction such that the distance between the inner oblique side 321Tb and the straight side 321Lb increases.

An extended side 321Pb is provided in a region of the second curve portion ferrite core 321b, the region being located inward of the coil 22L. The extended side 321Pb extends from the inner end of the straight side 321Lb toward the straight portion ferrite core 322. This extended side 321Pb intersects with the outer oblique side 321Sb.

Gaps (clearances) 323 are provided between the curve portion ferrite cores 321 adjacent to each other, and between each of the curve portion ferrite cores 321 and the straight portion ferrite cores 322 adjacent to the curve portion ferrite core 321. More specifically, the four straight portion ferrite cores 322 are provided between the curve portion ferrite cores 321 adjacent to each other, and the gap (the clearance) 323 is provided between each of the curve portion ferrite cores 321 and each of the straight portion ferrite cores 322 adjacent to the curve portion ferrite core 321.

Each of the gaps 323 is configured to widen in the circumferential direction of the coil 22L, from the inside of the coil 22L toward the outside thereof. No magnetic flux passes through the gaps 323. Thus, magnetic flux can be passed, in a concentrated manner, through the regions where the ferrite cores 321, 322 are provided, particularly through the curve portion ferrite cores 321.

As a result, the magnetic flux density in the regions where the curve portion ferrite cores 221 are provided can be further increased. As shown in FIG. 7, the height h of the magnetic field line ML from the surface of each of the curve portion ferrite cores 221 is high, and thus, the power transmission/reception efficiency can be increased.

Next, heat generation states of the ferrite cores 321, 322 of the coil unit 320 configured as described above will be described with reference to FIGS. 8 and 9. FIG. 8 is a schematic view showing heat generation states of the ferrite cores 321, 322. In the drawing, regions that are hatched by dots indicate low-temperature regions, and regions that are not hatched by dots indicate high-temperature regions.

Referring to FIG. 8, in the configuration of each of the ferrite cores 321 according to the present embodiment, the first curve portion ferrite core 321a includes the straight side 321La that is located on the side of the virtual straight line L1, the outer oblique sides 321Sa, the inner oblique sides 321Ta, and the extended side 321Pa as described above.

In the case where a length direction L is defined as a direction in which the virtual straight line L1 of the first curve portion ferrite core 321a extends and a width direction W is defined as a direction perpendicular to the virtual straight line L1, the first curve portion ferrite core 321a has a maximum width region W10 at a center thereof in the length direction L. The maximum width region W10 is located at a position of an intersection point P10 of the two inner oblique sides 321Ta, that is, the maximum width region W10 is a region corresponding to the substantially central region of the coil 22L.

As described above with reference to FIG. 4, magnetic flux concentrates at the region corresponding to the substantially central region of the coil 22L. Therefore, the magnetic flux density is high at the region corresponding to the substantially central region of the coil 22L. As a result, the region corresponding to the substantially central region of the coil 22L is a region where the temperature is likely to be highest in the first curve portion ferrite core 321a. Thus, the width (W10 in the W direction) of the first curve portion ferrite core 321a is maximized at the region corresponding to the substantially central region of the coil 22L, and the width (W11 and W21 in the W direction) of the first curve portion ferrite core 321a is decreased in each lateral direction (in other words, each of directions toward both ends of the first curve portion ferrite core 321a, i.e., the L direction) in which the magnetic flux density of the coil 22L decreases. That is, the width (in the W direction) of the first curve portion ferrite core 321a is set to be large in the region where a large amount of heat is generated, and the width (in the W direction) of the first curve portion ferrite core 321a is set to be small in the regions where a small amount of heat is generated. The same applies to the second curve portion ferrite core 321b.

The generated heat can be dispersed by employing this configuration. Thus, it is possible to avoid occurrence of a situation where the temperature becomes high in the region where a large amount of heat is generated. In each of the curve portion ferrite cores 321 facing the curve portions 22L1 of the coil 22L, the width of the regions where the temperature of the ferrite core becomes high is larger than the width of the other regions. Thus, heat is dispersed in accordance with the heat generation states. Thus, when each of the curve portion ferrite cores 321 is observed as a whole, heat is equalized. As a result, generation of a heat gradient can be suppressed in each of the curve portion ferrite cores, and thus, the thermal stress can be reduced. Thus, the loss of magnetic energy can be reduced. In the present embodiment, the thermal stress can be reduced by approximately 75% as compared to the configuration of the ferrite core 221 shown in FIGS. 4 and 5.

The gaps 323 are provided between each of the curve portion ferrite cores 321 and the straight portion ferrite cores 322 adjacent to the curve portion ferrite core 321. Thus, magnetic flux passes, in a concentrated manner, through the regions where the curve portion ferrite cores 321 are provided. Therefore, the temperature of the curve portion ferrite cores 321 is likely to become high. However, in the present embodiment, heat is equalized by employing the above-described configuration. Thus, it is possible to suppress generation of a heat gradient in the curve portion ferrite cores, to reduce a thermal stress, and to reduce the loss of magnetic energy, while maintaining the height h of the magnetic field line ML from the surfaces of the curve portion ferrite cores 321 to maintain the increased power transmission/reception efficiency.

Furthermore, the first curve portion ferrite core 321a and the second curve portion ferrite core 321b are disposed on respective sides of the virtual straight line such that a gap is provided between the first curve portion ferrite core 321a and the second curve portion ferrite core 321b. Thus, the generated heat can be dispersed to the two ferrite cores. This also makes it possible to avoid occurrence of a situation where heat is locally generated in the ferrite cores.

Figure 10:
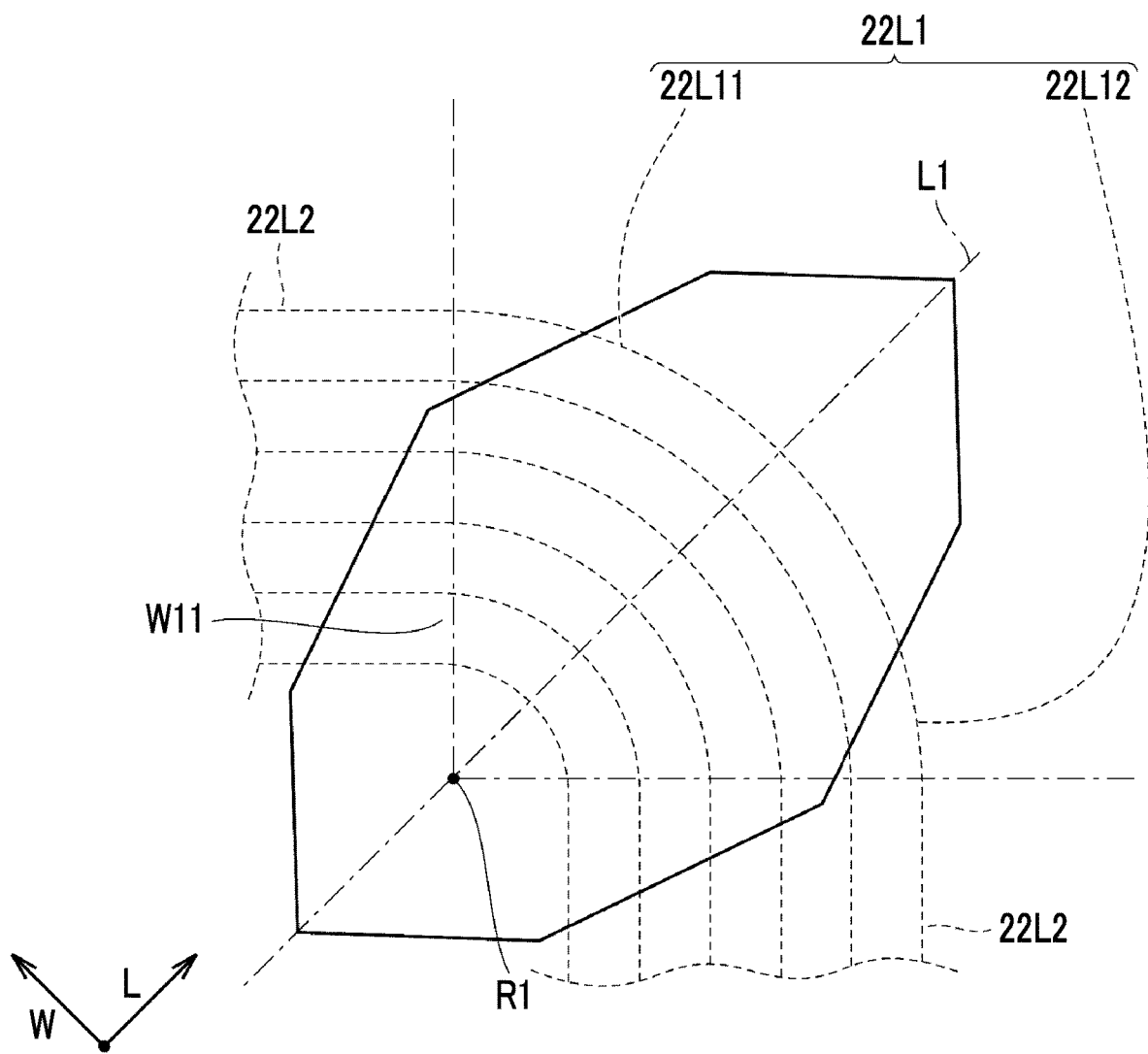
FIG. 10 is a partially enlarged view of a ferrite core and a core that are employed in a coil unit that is used for a power transmission device and a power reception device according to another embodiment.

In the above-mentioned embodiment, each of the curve portion ferrite cores 321 located at angular portions includes the two ferrite cores, namely, the first curve portion ferrite core 321a and the second curve portion ferrite core 321b. However, as shown in FIG. 10, each of the curve portion ferrite cores 321 may be configured as a single ferrite core.

Figure 11:
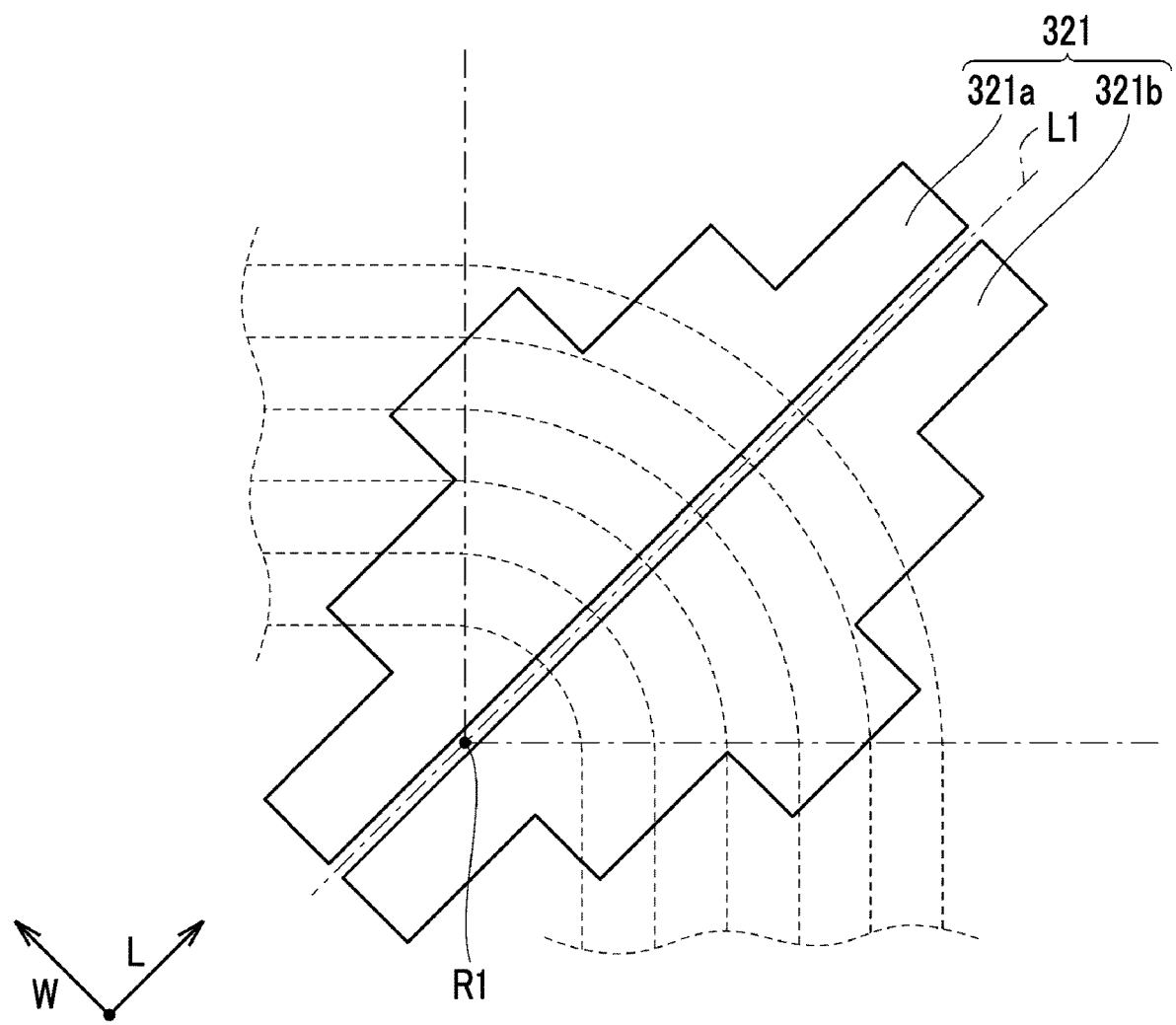
FIG. 11 is a partially enlarged view of a ferrite core and a core that are employed in a coil unit that is used for a power transmission device and a power reception device according to still another embodiment.

Furthermore, still another embodiment will be described. The outer oblique side 321Sa and the inner oblique side 321Ta of the first curve portion ferrite core 321a shown in FIGS. 8 and 9 are gradually inclined such that the width (in the W direction) of the first curve portion ferrite core 321a is changed. However, as shown in FIG. 11, the width (in the W direction) of the first curve portion ferrite core 321a may be changed by employing a stepped outline. The same applies to the width of the second curve portion ferrite core 321b.

In the above-described embodiment, the first curve portion ferrite core 321a and the second curve portion ferrite core 321b are symmetrical to each other with respect to the virtual straight line L1. However, if necessary, the shape of the first curve portion ferrite core 321a and the shape of the second curve portion ferrite core 321b may be different from each other.

The embodiments disclosed herein should be considered to be exemplary and nonrestrictive in all respects. Various modifications may be made to the above-described embodiments within the scope of the disclosure.

The disclosure is applicable to a power transmission device that transmits electric power to a power reception device in a contactless manner, and the power reception device that receives power from the power transmission device in a contactless manner.

What is claimed is:

1. A coil unit comprising:
   ferrite cores each of which is in a form of a plate; and
   a coil that is disposed to face the ferrite cores, the coil surrounding an area around a winding axis extending in a thickness direction of each of the ferrite cores, and the coil including a plurality of curve portions, wherein
   each of the plurality of curve portions of the coil is wound across a virtual straight line extending through a curvature center of the curve portion,
   the ferrite cores include curve portion ferrite cores that are disposed to face the plurality of the curve portions, respectively, and
   each of the curve portion ferrite cores is provided such that a width of a region with a highest magnetic flux density is larger than a width of a region other than the region with the highest magnetic flux density,
   in a region that faces the coil,
   in a case where a length direction is defined as a direction in which the virtual straight line extends, and
   a width direction is defined as a direction perpendicular to the virtual straight line.

2. The coil unit according to claim 1, wherein: in each of the curve portion ferrite cores, the region with the highest magnetic flux density is located at a center of the curve portion ferrite core in the length direction; and each of the curve portion ferrite cores is provided such that a width of the center of the curve portion ferrite core is larger than a width of both ends of the curve portion ferrite core.

3. The coil unit according to claim 1, wherein a gap is provided between the curve portion ferrite cores, and the gap widens in a circumferential direction of the coil, from an inside of the coil toward an outside of the coil.

4. The coil unit according to claim 3, wherein:
each of the curve portion ferrite cores includes a first curve portion ferrite core and a second curve portion ferrite core,
the first curve portion ferrite core being disposed to correspond to a first side of the coil on one side of the virtual straight line,
the first curve portion ferrite core extending from an inside of a corresponding one of the plurality of curve portions to an outside of the corresponding one of the plurality of curve portions,
the second curve portion ferrite core being disposed to correspond to a second side of the coil on another side of the virtual straight line, and
the second curve portion ferrite core extending from the inside of the corresponding one of the plurality of curve portions to the outside of the corresponding one of the plurality of curve portions; and
the first curve portion ferrite core and the second curve portion ferrite core are disposed on respective sides of the virtual straight line such that a gap is provided between the first curve portion ferrite core and the second curve portion ferrite core.

5. The coil unit according to claim 4, wherein the first curve portion ferrite core and the second curve portion ferrite core are symmetrical to each other with respect to the virtual straight line.

6. The coil unit according to claim 1, wherein:
the coil has a rectangular shape as viewed in a direction of the winding axis;
the coil is wound at 90 degrees at each of the plurality of curve portions provided at four corners of the coil; and
the virtual straight line is a straight line that divides each of the plurality of curve portions into two portions at an angle of 45 degrees.

7. A power transmission device that transmits electric power to a power reception device in a contactless manner, the power transmission device comprising:
ferrite cores each of which is in a form of a plate; and
a coil that is disposed to face the ferrite cores,
the coil surrounding an area around a winding axis extending in a thickness direction of each of the ferrite cores, and
the coil including a plurality of curve portions, wherein
each of the plurality of curve portions of the coil is wound across a virtual straight line extending through a curvature center of the curve portion,
the ferrite cores include curve portion ferrite cores that are disposed to face the plurality of the curve portions, respectively, and
each of the curve portion ferrite cores is provided such that a width of a region with a highest magnetic flux density is larger than a width of a region other than the region with the highest magnetic flux density,
in a region that faces the coil, in a case where a length direction is defined as a direction in which the virtual straight line extends, and
a width direction is defined as a direction perpendicular to the virtual straight line.

8. A power reception device that receives electric power from a power transmission device in a contactless manner, the power reception device comprising:
ferrite cores each of which is in a form of a plate; and
a coil that is disposed to face the ferrite cores, the coil surrounding an area around a winding axis extending in a thickness direction of each of the ferrite cores, and the coil including a plurality of curve portions, wherein each of the plurality of curve portions of the coil is wound across a virtual straight line extending through a curvature center of the curve portion, the ferrite cores include curve portion ferrite cores that are disposed to face the plurality of the curve portions, respectively, and each of the curve portion ferrite cores is provided such that a width of a region with a highest magnetic flux density is larger than a width of a region other than the region with the highest magnetic flux density, in a region that faces the coil, in a case where a length direction is defined as a direction in which the virtual straight line extends, and a width direction is defined as a direction perpendicular to the virtual straight line.

9. The coil unit according to claim 1, wherein the virtual line extends along a surface of each of the curve portion ferrite cores, the surface facing a corresponding one of the curve portions of the coil.

* * * * *